(12) United States Patent
Fornara et al.

(10) Patent No.: US 7,905,218 B2
(45) Date of Patent: Mar. 15, 2011

(54) INTAKE MANIFOLD WITH INTEGRATED CANISTER CIRCUIT FOR A SUPERCHARGED INTERNAL COMBUSTION ENGINE

(75) Inventors: Stefano Fornara, Modena (IT); Michele Pecora, Potenza (IT)

(73) Assignee: Magnetti Marelli Powertrain S.p.A., Corbetta (IT)

( * ) Notice: Subject to any disclaimer, the term of this patent is extended or adjusted under 35 U.S.C. 154(b) by 284 days.

(21) Appl. No.: 12/258,852

(22) Filed: Oct. 27, 2008

(65) Prior Publication Data

US 2009/0114180 A1    May 7, 2009

(30) Foreign Application Priority Data

Oct. 29, 2007   (EP) ..................... 07425676

(51) Int. Cl.
   *F02M 33/04*   (2006.01)
   *F02M 33/00*   (2006.01)
(52) U.S. Cl. ..................................... 123/520
(58) Field of Classification Search .......... 123/520, 123/519, 518, 516, 184.1, 559.1, 563, 316, 123/184.47; 137/587, 588, 589, 493, 43
See application file for complete search history.

(56) References Cited

U.S. PATENT DOCUMENTS

2004/0237946 A1* 12/2004 Murakami et al. ............ 123/520
2010/0218749 A1*  9/2010 Fornara et al. ................ 123/520

FOREIGN PATENT DOCUMENTS

| EP | 0 463 267 A1 | 1/1992 |
| FR | 2 891 021 A1 | 3/2007 |
| FR | 2 891 022 A1 | 3/2007 |

OTHER PUBLICATIONS

European Search Report mailed May 19, 2008 issued in EP 07 42 5676.

* cited by examiner

*Primary Examiner* — Mahmoud Gimie
(74) *Attorney, Agent, or Firm* — Venable LLP; Robert Kinberg

(57) ABSTRACT

An intake manifold with integrated canister circuit for a supercharged internal combustion engine. The intake manifold includes a tubular body in which a plenum is defined. A sorting chamber is in a wall of the tubular body. A canister solenoid valve is arranged in the sorting chamber and is adapted to adjust the introduction of gasoline vapors into the sorting chamber itself. A first pipe in the wall of the tubular body puts the sorting chamber into communication with the plenum, and defines a first branch of a recovery pipe. A one-way valve is arranged in the sorting chamber at the first pipe. A second pipe in the wall of the tubular body puts the sorting chamber into communication with the intake pipe upstream of a compressor, and defines an initial portion of a second branch of the recovery pipe.

9 Claims, 5 Drawing Sheets

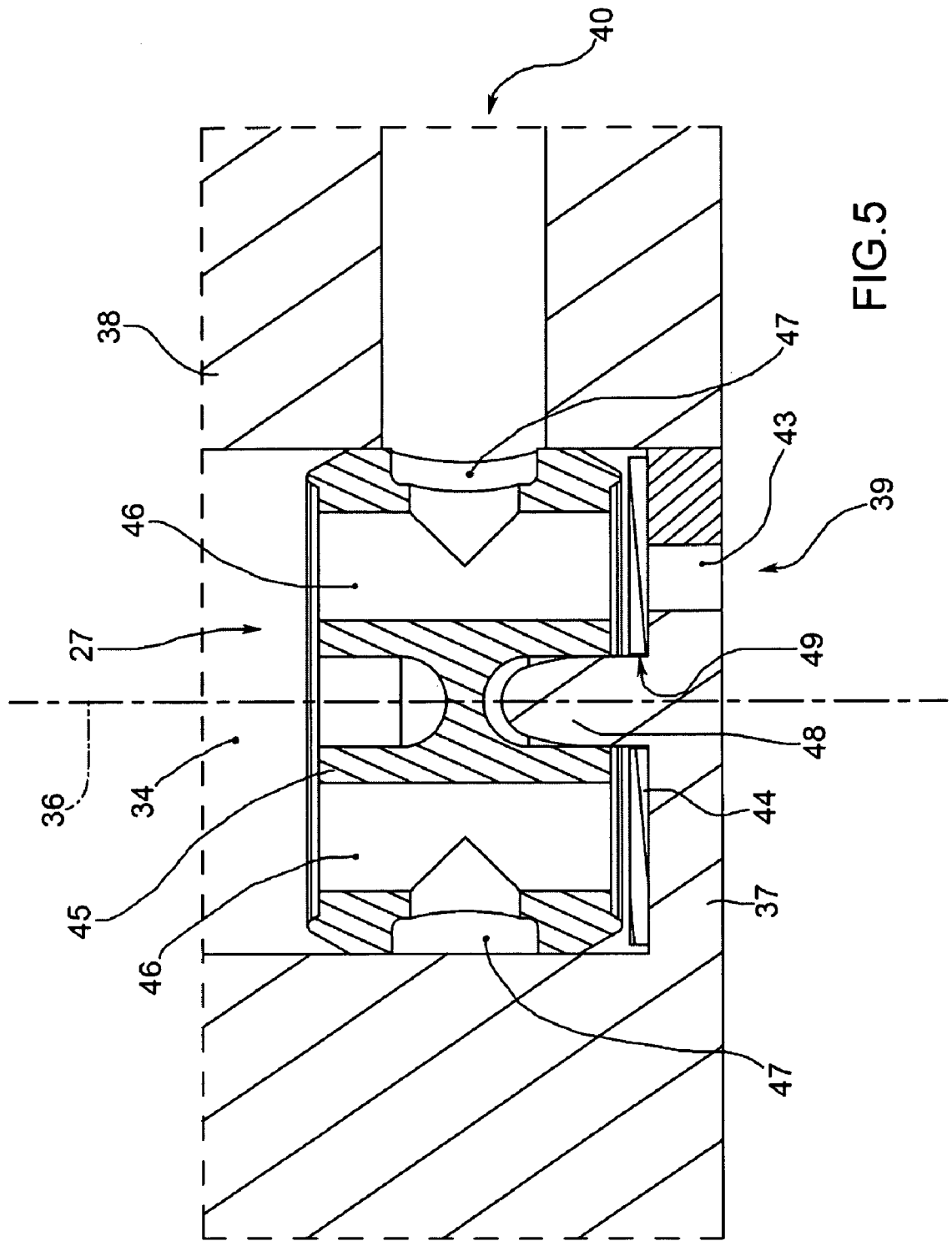

INTAKE MANIFOLD WITH INTEGRATED CANISTER CIRCUIT FOR A SUPERCHARGED INTERNAL COMBUSTION ENGINE

CROSS REFERENCE TO RELATED APPLICATION

This application claims the priority of European Patent Application No: 07425676.9, filed on Oct. 29, 2007, the subject matter of which is incorporated herein by reference.

TECHNICAL FIELD

The present invention relates to an intake manifold with integrated canister circuit for a supercharged internal combustion engine.

BACKGROUND ART

An internal combustion engine is provided with a canister circuit, which has the function of recovering the fuel vapours which are produced in the fuel tank and of introducing such fuel vapours into the cylinders in order to be burnt; this prevents the fuel vapours which are produced in the fuel tank from leaking from the fuel tank (specifically when the fuel filler cap is opened for refueling) and being freely dispersed into the atmosphere.

In an aspirated internal combustion engine (i.e. without supercharging), the canister circuit comprises a recovery pipe which originates in the fuel tank and ends in the intake manifold plenum and is adjusted by a canister solenoid valve of the on/off type. Atmospheric pressure is essentially present inside the fuel tank, while a slight vacuum is present in the intake manifold plenum determined by the intake action generated by the cylinders; consequently, when the canister solenoid valve is open, the gasoline vapours are naturally sucked down along the recovery pipe from the fuel tank into the intake manifold plenum.

A supercharged internal combustion engine is provided with a turbocharger (either a turbocharger actuated by the exhaust gases or a volumetric turbocharger actuated by the drive shaft) which in some moments compresses the aspirated air in order to increase the volumetric efficiency. By effect of the action of the turbocharger in a supercharged internal combustion engine, in the intake manifold plenum there may be either a slight vacuum determined by the intake action generated by the cylinders (turbocharger not running) or an overpressure determined by the compression action of the turbocharger (turbocharger running). Consequently, in a supercharged internal combustion engine, the canister circuit is more complex because, downstream of the canister solenoid valve, the recovery pipe has a fork adjusted by a one-way membrane valve; one branch of the recovery pipe fork leads to the intake manifold plenum, while the other branch of the recovery pipe fork leads to an intake manifold upstream of the turbocharger. When the turbocharger is not running, there is a slight vacuum determined by the aspiration action of the cylinders in the intake manifold plenum, while there is atmospheric pressure in the intake pipe upstream of the compressor; in this situation, the one-way membrane valve allows the gasoline vapours to enter the intake manifold plenum directly. When the compressor is running, there is an overpressure determined by the compression action of the compressor in the intake manifold plenum, while there is a vacuum determined by the intake action of the compressor in the intake pipe upstream of the compressor; in this situation, the one-way membrane valve allows the gasoline vapours to enter the intake pipe upstream of the compressor.

By effect of the presence of the fork in the recovery pipe and of the one-way membrane valve, the canister circuit of a supercharged internal combustion engine has various external components (tubings and pipe fittings) and is relatively complex and extended; consequently, the assembly of the canister circuit of a supercharged internal combustion engine takes a relatively long assembly time and thus determines a non-negligible assembly cost.

DISCLOSURE OF INVENTION

It is the object of the present invention to make an intake manifold with integrated canister circuit for a supercharged internal combustion engine, such an intake manifold with integrated canister circuit being free from the above-described drawbacks, being easy and cost-effective to manufacture, having a small number of components and being simple to assemble.

According to the present invention an intake manifold with integrated canister circuit for a supercharged internal combustion engine is made according to what set forth in the attached claims.

BRIEF DESCRIPTION OF THE DRAWINGS

The present invention will now be described with reference to the accompanying drawings, which illustrate a non-limitative embodiment thereof, in which:

FIG. 5 is an enlarged scale view of a one-way membrane valve in FIG. 4.

PREFERRED EMBODIMENT OF THE INVENTION

Figure 1:
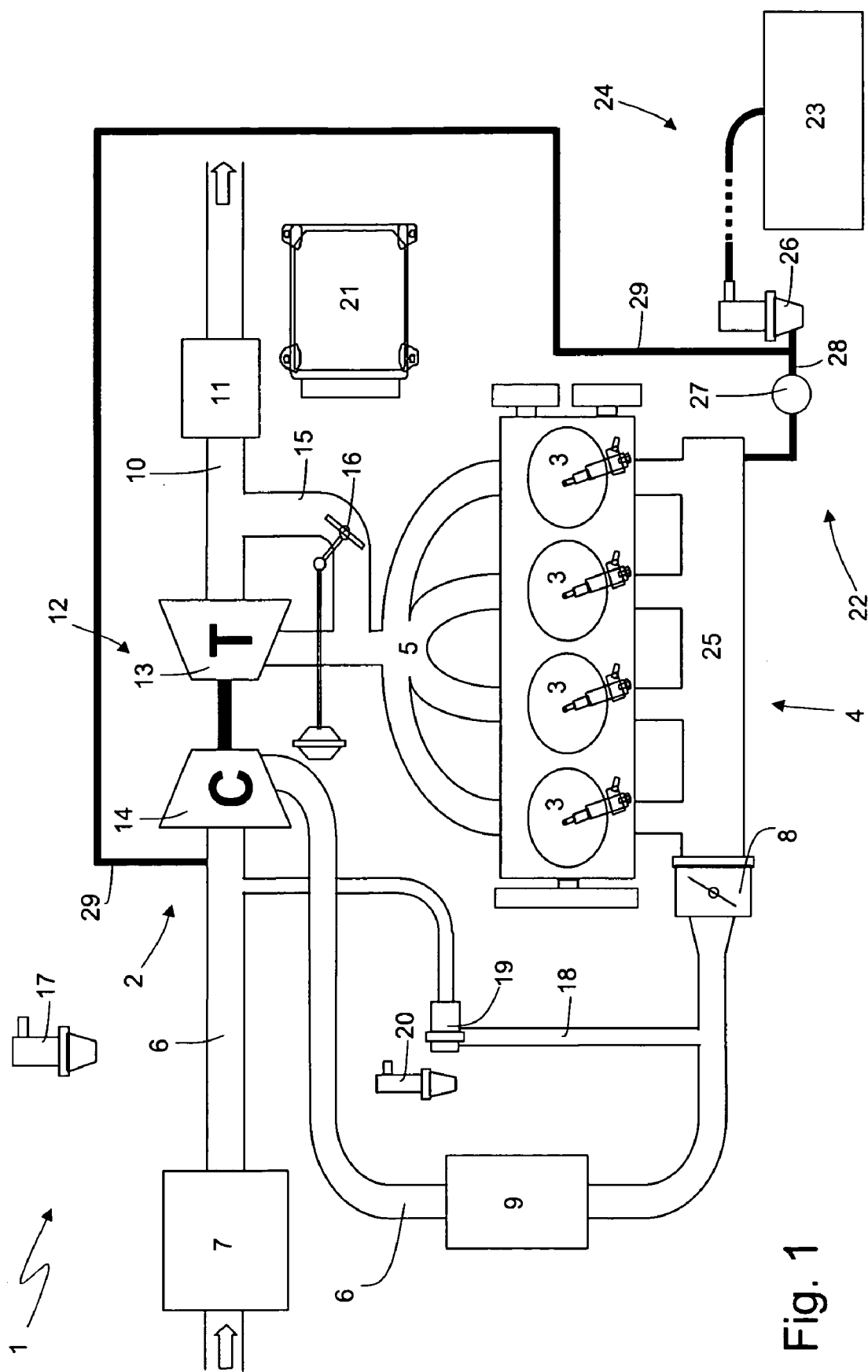
FIG. 1 diagrammatically shows an internal combustion engine supercharged by a turbocharger and provided with an intake manifold with integrated canister circuit made according to the present invention.

In FIG. 1, numeral 1 indicates as a whole an internal combustion engine supercharged by a turbocharger supercharging system 2.

The internal combustion engine 1 comprises four cylinders 3, each of which is connected to an intake manifold 4 by means of at least one corresponding intake valve (not shown) and to an exhaust manifold 5 by means of at least one corresponding exhaust valve (not shown). The intake manifold 4 receives fresh air (i.e. air coming from the external environment) through an intake pipe 6, which is provided with an air filter 7 and is adjusted by a butterfly valve 8. An intercooler 9 for cooling the aspirated air is arranged along the intake pipe 6. To the exhaust manifold 5 there is connected an exhaust pipe 10 which feeds the exhaust gases produced by the combustion to an exhaust system, which emits the gases produced by the combustion into the atmosphere and normally comprises at least one catalyzer 11 and at least one muffler (not shown) arranged downstream of the catalyzer 11.

The supercharging system 2 of the internal combustion engine 1 comprises a turbocharger 12 provided with a turbine 13, which is arranged along the exhaust pipe 10 in order to rotate at high speed under the action of the exhaust gases expelled from the cylinders 3, and a compressor 14, which is arranged along the intake pipe 6 and is mechanically connected to the turbine 13 in order to be rotationally pulled by the turbine 13 itself and thus to increase the pressure of the air fed into the intake pipe 6.

Along the exhaust pipe 10 a bypass pipe 15 is provided, which is connected in parallel to the turbine 13 so as to have the ends thereof connected upstream and downstream of the turbine 13 itself; along the bypass pipe 15 a wastegate valve 16 is arranged, which is adapted to adjust the flow rate of the exhaust gases which flow through the bypass pipe 15 and is driven by an actuator 17. Along the intake pipe 6 a bypass pipe 18 is provided, which is connected in parallel to the compressor 14 so as to have the ends thereof connected upstream and downstream of the compressor 14 itself; along the bypass pipe 18 a Poff valve 19 is arranged, which is adapted to adjust the flow rate of air which flows through the bypass pipe 18 and is driven by an actuator 20.

The internal combustion engine 1 is controlled by an electronic control unit 21, which supervises the operation of all the components of the internal combustion engine 1.

Furthermore, the internal combustion engine 1 comprises a canister circuit 22, which has the function of recovering the fuel vapours which are produced in a fuel tank 23 and of introducing such fuel vapours into the cylinders 3 in order to be burnt; this prevents the fuel vapours which are produced in the fuel tank 23 from leaking from the fuel tank 23 (specifically when the fuel filler cap is opened for refueling) and being freely dispersed into the atmosphere.

The canister circuit 22 comprises a recovery pipe 24 which originates in the fuel tank 23 and ends in a plenum 25 of the intake manifold 4 and is controlled by a canister solenoid valve 26 of the on/off type. Downstream of the canister solenoid valve 26, the recovery pipe 24 has a fork adjusted by a one-way membrane valve 27; one branch 28 of the recovery pipe 24 leads into the plenum 25 of the intake manifold 4, while the other branch 29 of the recovery pipe 24 leads into the intake pipe 6 upstream of the turbocharger 12. Specifically, the one-way membrane valve 27 is coupled to the mouth of the branch 28 of the recovery pipe 24 so as to allow the gas flow only towards the plenum 25 of the intake manifold 4.

In the plenum 25 of the intake manifold 4 there may be either a slight vacuum determined by the intake action generated by the cylinders (turbocharger 12 not running) or an overpressure determined by the compression action of the turbocharger 12 (turbocharger 12 running). When the turbocharger 12 is not running, there is a slight vacuum determined by the intake action generated by the cylinders in the plenum 25 of the intake manifold 4, while there is atmospheric pressure in the intake pipe 6 upstream of the turbocharger 12; in this situation, the one-way membrane valve 27 opens the branch 28 of the fork of the recovery pipe 24 and thus allows the gasoline vapours to enter the plenum 25 of the intake manifold 4 directly through the branch 28 of the recovery pipe 24. When the turbocharger 12 is running, there is an overpressure determined by the compression action of the turbocharger 12 in the plenum 25 of the intake manifold 4, while there is a vacuum determined by the intake action of the turbocharger 12 in the intake pipe 6 upstream of the turbocharger 12; in this situation, the one-way membrane valve 27 closes the branch 28 of the recovery pipe 24 and therefore the gasoline vapours enter in the intake pipe 6 upstream of the turbocharger 12 through the branch 29 of the recovery pipe 24.

Figure 2:
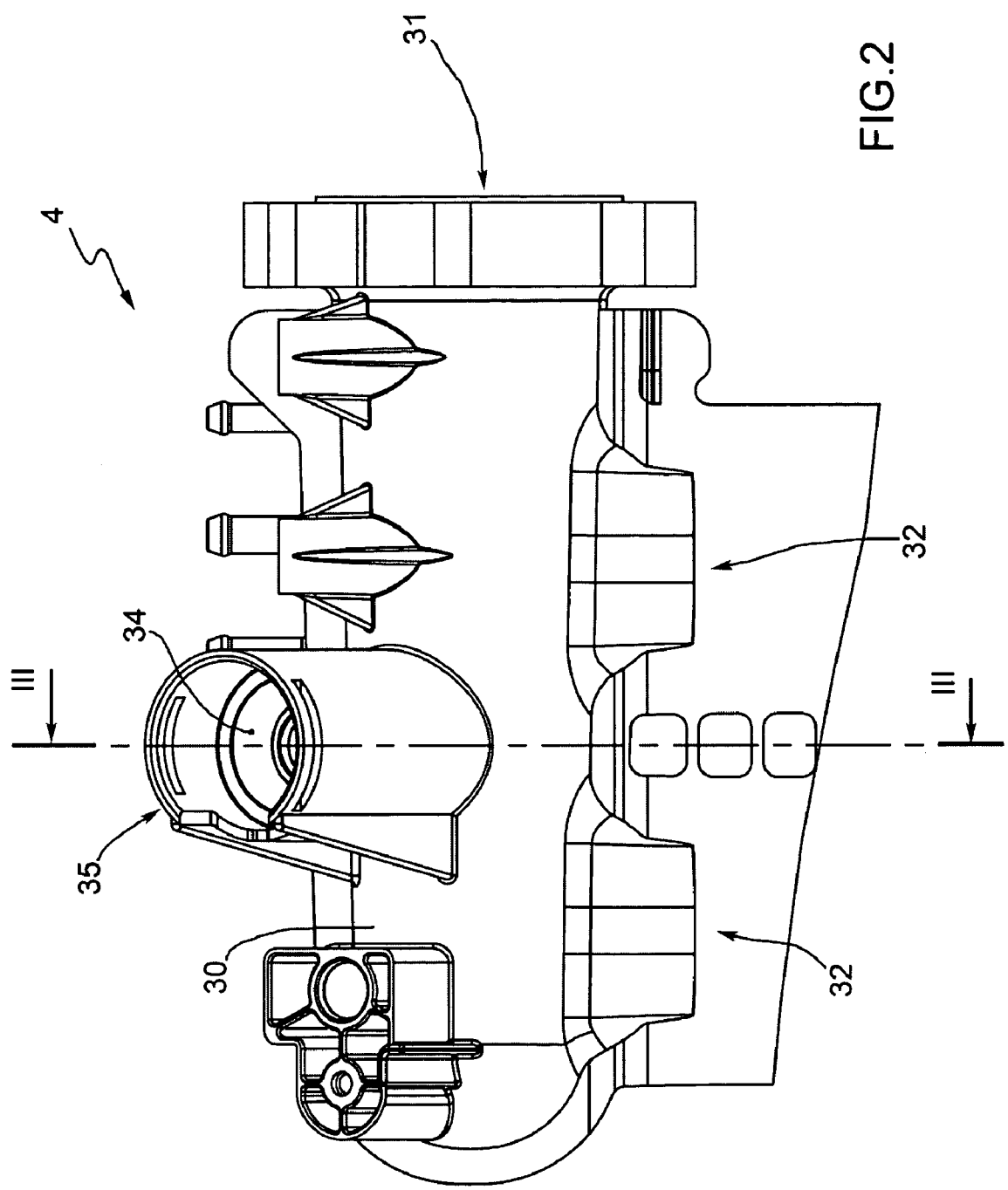
FIG. 2 is a diagrammatic perspective view with parts removed for clarity of the intake manifold in FIG. 1.
Figure 3:
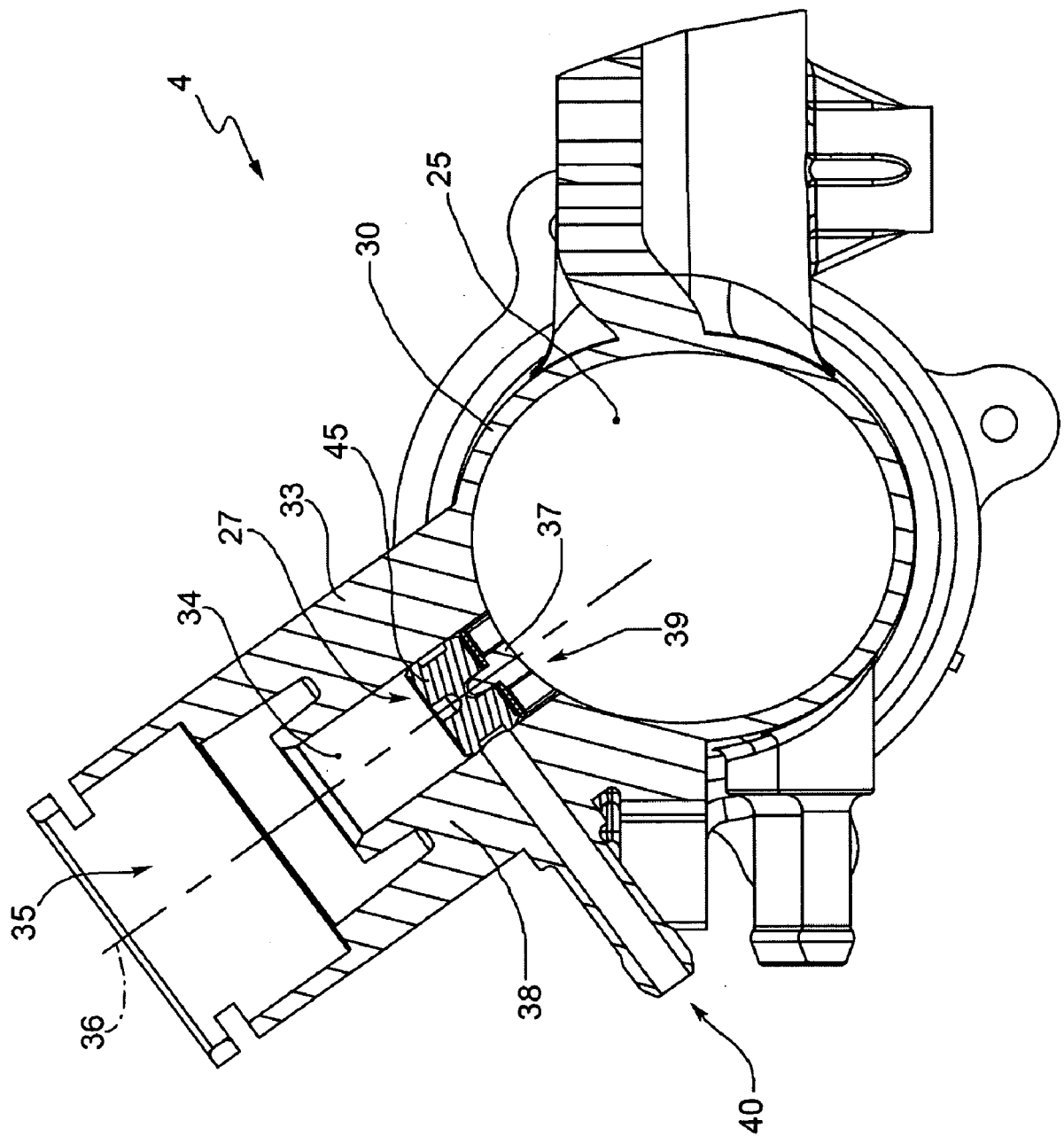
FIG. 3 is a cross section taken along the line III-III of the intake manifold in FIG. 2.
Figure 4:
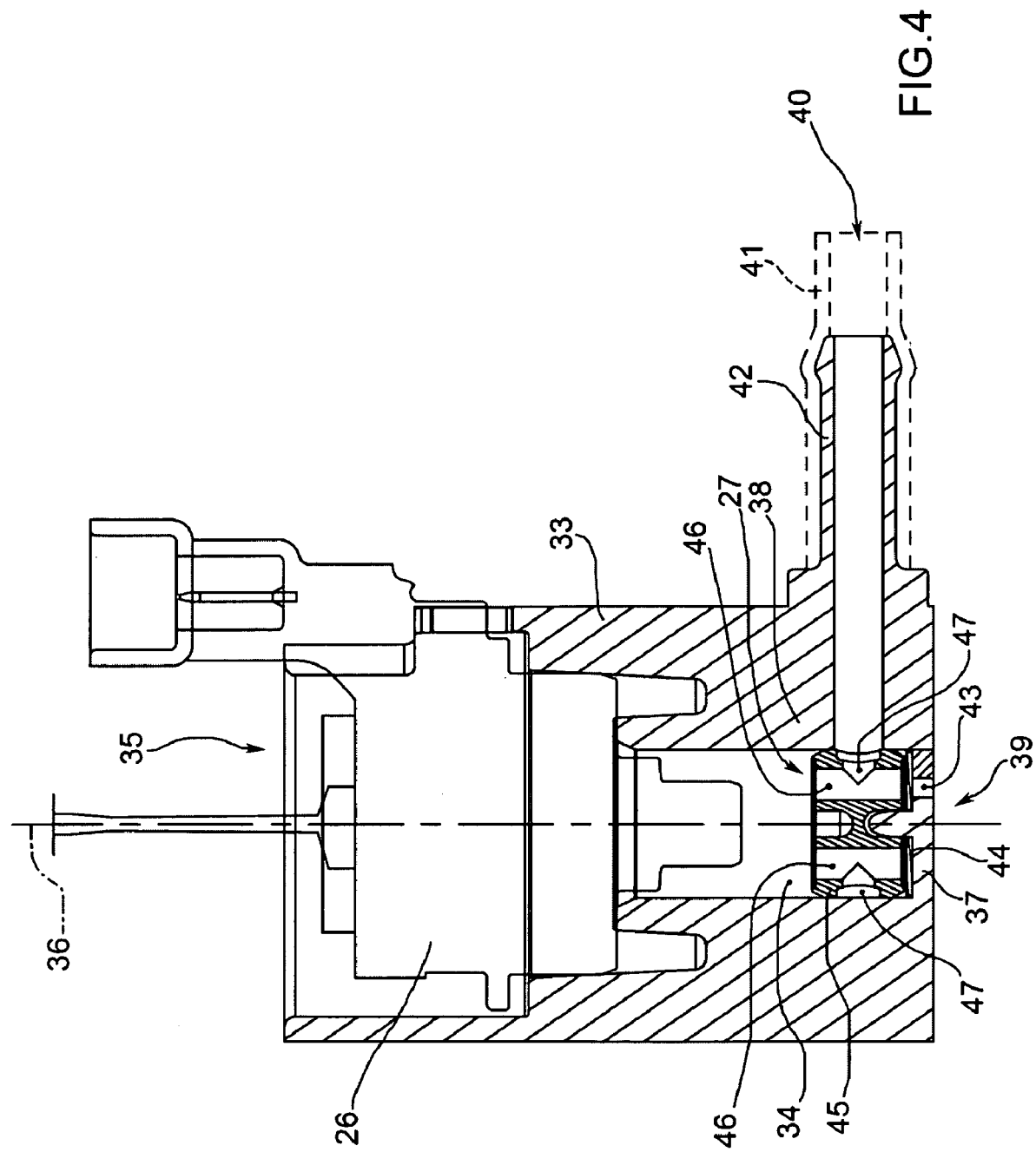
FIG. 4 is an enlarged scale view of a part of FIG. 3.

As shown in FIG. 2, the intake manifold 4 comprises a tubular body 30 which is normally made of molded plastic material in which the plenum 25 is defined, which has an inlet opening 31 connected to the intake pipe 6 by means of the butterfly valve 8 and a number of outlet openings 32 (only two of which are shown in FIG. 2) towards the cylinders 3.

In a wall 33 of the tubular body 30 there is obtained a sorting chamber 34, which has a tubular cylindrical shape with an open upper end 35; specifically, the sorting chamber 34 has a longitudinal symmetry axis 36 and is delimited by a circular base wall 37 at the lower end thereof and laterally delimited by a cylindrical side wall 38. The canister solenoid valve 26 closing the open upper end 35 is arranged in an upper portion of the sorting chamber 34; in this matter, the canister solenoid valve 26 adjusts the introduction of gasoline vapours coming from the fuel tank 23 into the sorting chamber 34 itself.

In the wall 33 of the tubular body 30, a pipe 39 is obtained, which puts the sorting chamber 34 into communication with the plenum 25 and defines the branch 28 of the recovery pipe 24; specifically, the pipe 39 is axially arranged and obtained through the base wall 37 of the sorting chamber 34. The one-way membrane valve 27 is arranged in the sorting chamber 34 at the pipe 39 to allow only a flow towards the plenum 25 through the pipe 39 itself.

Furthermore, in the wall 33 of the tubular body, a pipe 40 is obtained, which puts the sorting chamber 34 into communication with the intake pipe 6 upstream of the compressor 14 and defines an initial portion of the branch 29 of the recovery pipe 24; specifically, the pipe 40 is radially arranged and is obtained through the side wall 38 of the sorting chamber 34. An end portion of the branch 29 of the recovery pipe 24 is defined by a flexible tube 41 which has one end terminating in the intake pipe 6 upstream of the compressor 14 and one opposite end engaged into the pipe 40; specifically, the pipe 40 ends with a tubular pipe 42 which protrudes from the wall 33 of the tubular body 30 and is adapted to be tightly engaged within the flexible tube 41.

As shown in FIG. 5, the pipe 39 consists of a number of axial through holes 43, only one of which is shown in FIG. 5, which are obtained through the base wall 37 and are distributed about the longitudinal symmetry axis 36. The one-way valve 27 comprises a flexible ring-shaped membrane 44 which is arranged over the axial through holes 43 of the pipe 39, and a retaining element 45 which is driven into the sorting chamber 34 and is arranged over the flexible membrane 44 to keep the flexible membrane 44 itself in position. The retaining element 45 displays a cylindrical shape having a plurality of axial through holes 46 which lead to the axial through holes 43 of the pipe 39. Furthermore, the retaining element 45 has a radial hole 47 which intercepts a corresponding axial through hole 46 and leads to the pipe 40; in the embodiment shown in FIG. 5, the retaining element 45 comprises two radial holes 47 (one of which is obviously of no use) in order to be symmetric.

According to the embodiment shown in FIG. 5, the base wall 37 of the sorting chamber 34 has a central pin 48 which engages a central hole 49 of the flexible membrane 44 so as to keep the flexible membrane 44 locked and avoid radial movements of the flexible membrane 44 itself; in this embodiment, the flexible membrane 44 is inserted in the sorting chamber 34 and then locked in the central pin 48 and subsequently the retaining element 45 is driven into the sorting chamber 34 over the flexible membrane 44. According to an alternative embodiment (not shown), the central pin 48 which engages the central hole 49 of the flexible membrane 44 is carried by the retaining element 45; in this embodiment, the flexible membrane 44 is coupled to the retaining element 45 being locked in the central pin 48 and then the retaining element 45 along with the flexible membrane 44 is driven into the sorting chamber 34.

The above-described intake manifold 4 with the integrated canister circuit 22 displays many advantages, because it is simple and cost-effective to implement, quick to assemble and at the same time is also particularly tough. Specifically, assembly is particularly quick because the number of components is reduced to the minimum and above all the installation of a single flexible tube is required (the flexible tube 41 which ends in the intake pipe 6 upstream of the compressor 14); indeed, the installation of a flexible tube in an internal combustion engine is particularly long-lasting and complex because such flexible tubes display a non-negligible rigidity (i.e. they are relatively little flexible to have good mechanical resistance and thus long operational life) and are thus difficult to bend in order to follow the irregular shapes of the internal combustion engine.

The invention claimed is:

1. An intake manifold with integrated canister circuit for a supercharged internal combustion engine provided with a compressor adapted to compress the intake air; the intake manifold comprises:
    a tubular body in which a plenum is defined, which has an inlet opening connected to an intake pipe along which the compressor is arranged and a number of outlet openings towards the cylinders of the internal combustion engine;
    a sorting chamber, which is obtained in a wall of the tubular body and has an open upper end;
    a canister solenoid valve, which is arranged in the sorting chamber to close the open upper end and is adapted to adjust the introduction of gasoline vapours coming from a fuel tank inside the sorting chamber itself;
    a first pipe, which is obtained in the wall of the tubular body, puts the sorting chamber into communication with the plenum, and defines a first branch of a recovery pipe;
    a one-way membrane valve, which is arranged in the sorting chamber at the first pipe to allow only a flow towards the plenum through the first pipe itself; and
    a second pipe, which is obtained in the wall of the tubular body, puts the sorting chamber into communication with the intake pipe upstream of the compressor, and defines an initial portion of a second branch of the recovery pipe.

2. An intake manifold according to claim 1, wherein the sorting chamber displays a cylindrical tubular shape, which has a longitudinal symmetry axis and is delimited by a circular base wall at the lower end thereof and laterally delimited by a cylindrical side wall; the first pipe is axially arranged and obtained through the base wall, while the second pipe is radially arranged and obtained through the side wall.

3. An intake manifold according to claim 2, wherein the first pipe consists of a number of axial through holes, which are obtained through the base wall and are distributed about the longitudinal symmetry axis.

4. An intake manifold according to claim 3, wherein the one-way valve comprises a flexible ring-shaped membrane which is arranged over the axial through holes of the first pipe, and a retaining element which is driven into the sorting chamber and is arranged over the flexible membrane in order to keep the flexible membrane itself in position.

5. An intake manifold according to claim 4, wherein the retaining element is cylinder-shaped and has a plurality of axial through holes which lead to the axial through holes of the first pipe.

6. An intake manifold according to claim 5, wherein the retaining element has a radial hole which intercepts a corresponding axial through hole and leads to the second pipe.

7. An intake manifold according to claim 5, wherein the retaining element has a central pin which engages a central hole of the flexible membrane.

8. An intake manifold according to claim 4, wherein the base wall of the sorting chamber has a central pin which engages a central hole of the flexible membrane.

9. An intake manifold according to claim 1, wherein the second pipe ends with a tubular pipe which protrudes from the wall of the tubular body and is adapted to be coupled to a flexible tube ending in the intake pipe upstream of the compressor.

* * * * *

UNITED STATES PATENT AND TRADEMARK OFFICE
CERTIFICATE OF CORRECTION

PATENT NO. : 7,905,218 B2
APPLICATION NO. : 12/258852
DATED : March 15, 2011
INVENTOR(S) : Fornara et al.

Page 1 of 1

It is certified that error appears in the above-identified patent and that said Letters Patent is hereby corrected as shown below:

Title page:

correct section (73) to -- Magneti Marelli Powertrain S.p.A., Corbetta (IT) --

Signed and Sealed this
Sixth Day of September, 2011

David J. Kappos
*Director of the United States Patent and Trademark Office*